(12) United States Patent
Jay et al.

(10) Patent No.: US 6,568,166 B2
(45) Date of Patent: May 27, 2003

(54) BACK-UP CONTROL APPARATUS FOR TURBO MACHINE

(75) Inventors: Alexandre Jay, Montreal (CA); Jim Robert Jarvo, St-Bruno (CA); Daniel Claude Gratton, St-Hilaire (CA)

(73) Assignee: Pratt & Whitney Canada Corp., Longueuil (CA)

( * ) Notice: Subject to any disclaimer, the term of this patent is extended or adjusted under 35 U.S.C. 154(b) by 39 days.

(21) Appl. No.: 09/742,304

(22) Filed: Dec. 22, 2000

(65) Prior Publication Data

US 2002/0078692 A1 Jun. 27, 2002

(51) Int. Cl.[7] ................................. F02C 9/28
(52) U.S. Cl. .................................... 60/39.281
(58) Field of Search ........................ 60/39.281, 243

(56) References Cited

U.S. PATENT DOCUMENTS

| | | | |
|---|---|---|---|
| 3,811,273 A | | 5/1974 | Martin |
| 3,975,902 A | | 8/1976 | Smith et al. |
| 3,978,659 A | * | 9/1976 | Smith et al. ............ 60/39.281 |
| 4,134,257 A | | 1/1979 | Riple |
| 4,248,040 A | * | 2/1981 | Kast ..................... 60/39.281 |
| 4,344,141 A | | 8/1982 | Yates |
| 4,397,148 A | * | 8/1983 | Stockton et al. ............ 60/223 |
| 4,429,528 A | | 2/1984 | Matthews et al. |
| 4,712,372 A | | 12/1987 | Dickey et al. |
| 4,718,229 A | | 1/1988 | Riley |
| 4,794,755 A | | 1/1989 | Hutto, Jr. et al. ........ 60/39.281 |
| 4,821,193 A | | 4/1989 | Barber et al. ............ 60/39.281 |
| 4,837,697 A | | 6/1989 | Eisa et al. |
| 5,083,277 A | | 1/1992 | Shutler |
| 5,363,317 A | | 11/1994 | Rice et al. |
| 5,394,689 A | | 3/1995 | D'Onofrio |
| 5,440,490 A | | 8/1995 | Summerfield |
| 5,513,493 A | | 5/1996 | Severn et al. |

FOREIGN PATENT DOCUMENTS

GB     1 597 129     9/1981

* cited by examiner

Primary Examiner—Louis J. Casaregola
(74) Attorney, Agent, or Firm—Ogilvy Renault

(57) ABSTRACT

A method and apparatus for controlling a turbo-machine in case of failure of the main burn fuel flow calculator. The apparatus receives at least information from various sensors as well as from the main burn fuel flow calculator. The method and apparatus, herein disclosed, provides a smooth and secure transition between the last burn fuel flow value before the failure of the main burn fuel flow calculator and the future burn fuel flow values.

5 Claims, 7 Drawing Sheets

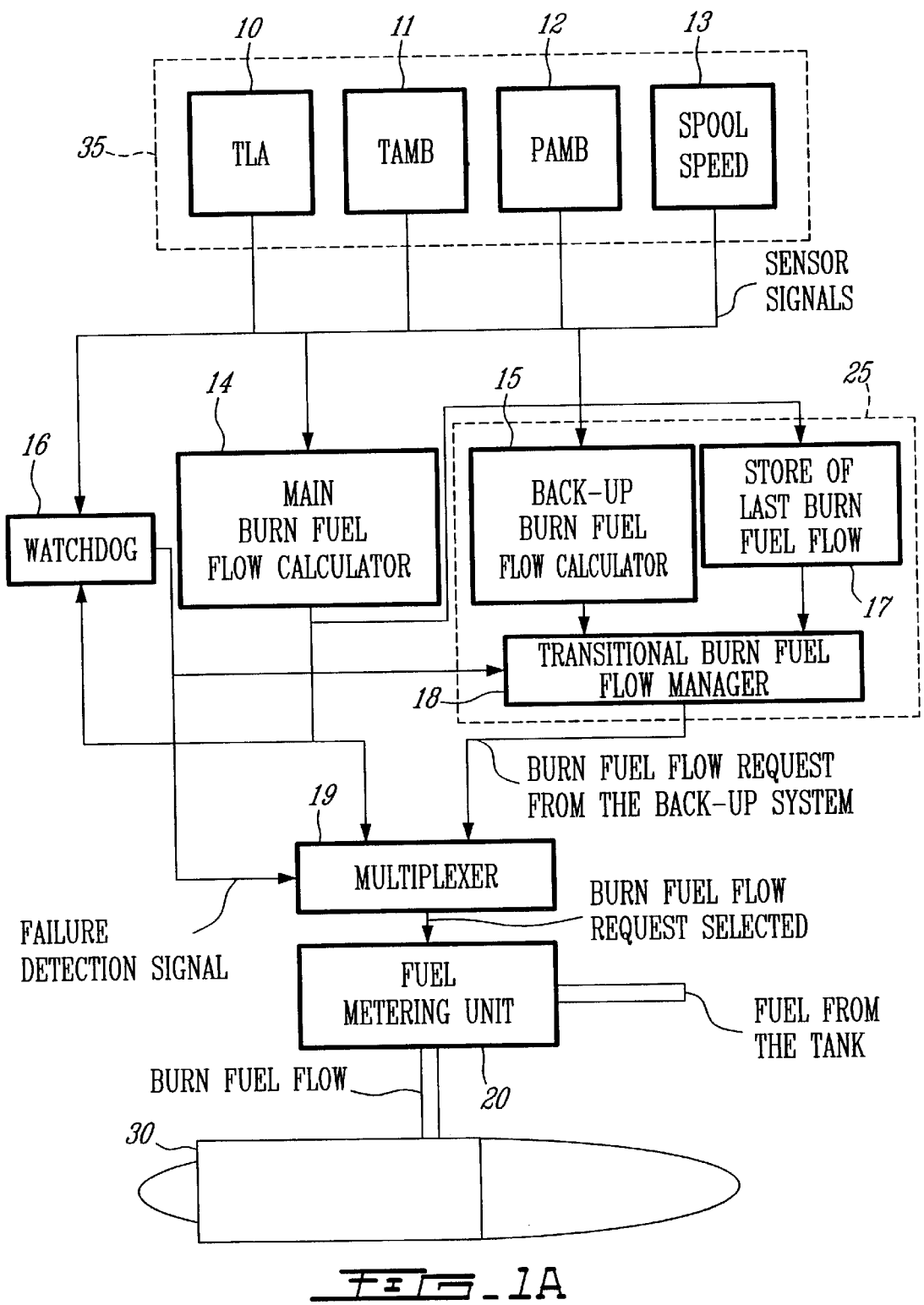
FIG_1A

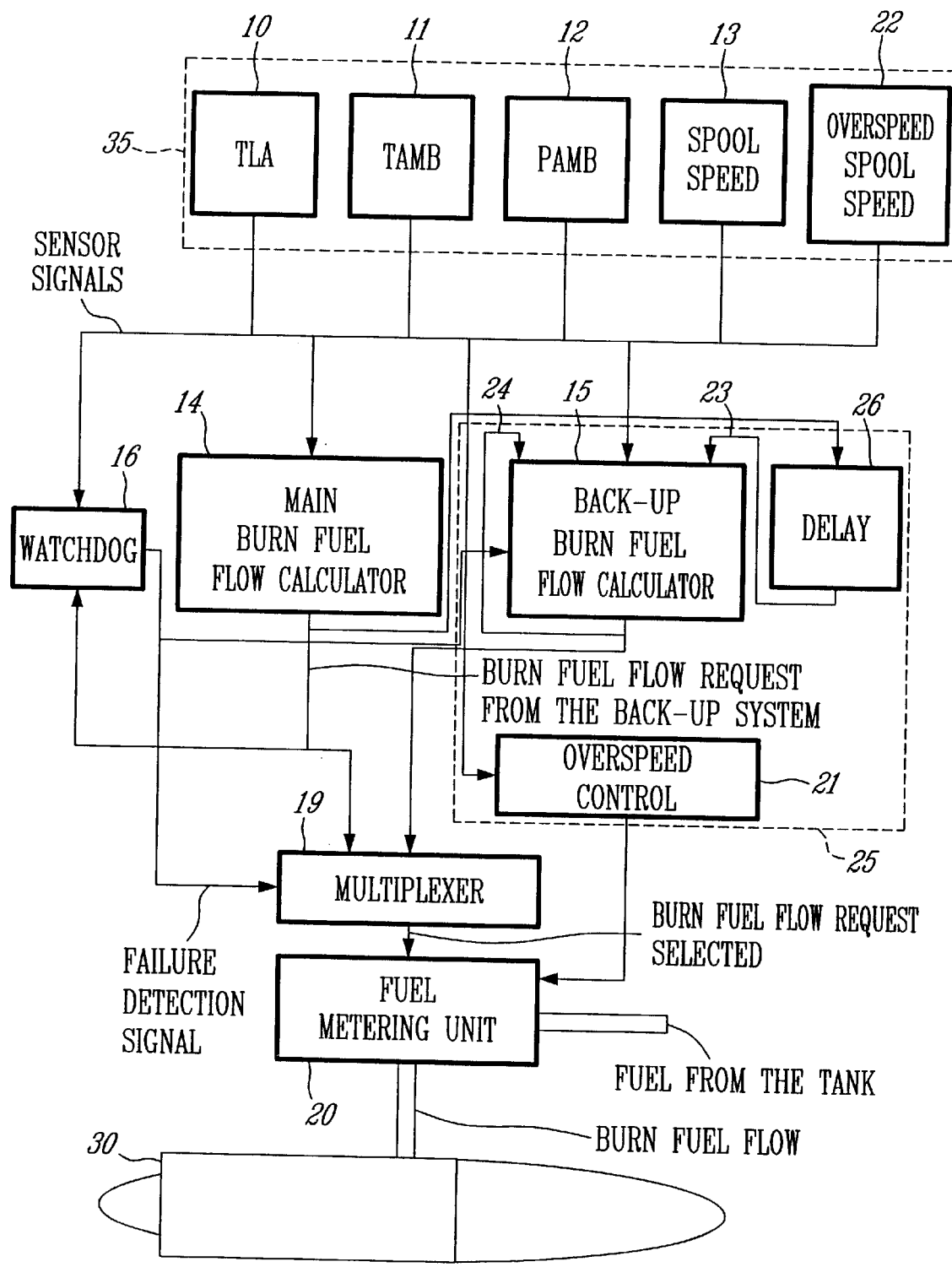
FIG_1B

FIG_4

BACK-UP CONTROL APPARATUS FOR TURBO MACHINE

FIELD OF INVENTION

This invention relates to a turbo-machine control system and more precisely to a digital electronic back-up control system.

BACKGROUND OF INVENTION

Modern aircraft engines are driven by an electronic engine control system, which controls the thrust and the torque delivered by the engine. Usually such systems are designed using a microprocessor, allowing the control algorithms to be implemented by software.

The electronic engine control system must at least detect an overspeed of the turbo-machinery that could be fatal for it. In such a case, it is important to cut off the fuel flow.

These control algorithms control the spool speed of the turbo-machinery by scheduling the bum fuel flow through a hydromechanical fuel metering unit. Sensors on the turbo-machine supply information on what is needed to drive the turbo-machine. The control algorithms which are running on the microprocessor provide the proper bum fuel flow using all the inputs.

In case of emergency, it is important to rely on a back-up system. Such back-up systems will provide the same information to the fuel metering unit, Two different configurations are now available.

In the first configuration available, the back-up system is a hydromechanical back-up system. In this configuration, the back-up system controls the bum fuel flow through a mechanical, hydraulic or pneumatic control system.

In the other configuration available, the back-up system is another electronic engine control system identical to the main electronic control system. Such a parallel system is named a dual channel electronic engine control system. A special algorithm might be used to ensure a proper switch between one channel and the other.

Furthermore, the use of a hydromechanical back-up control increases the weight and the complexity of the control system, thus this is not an advantageous solution for a use in an aircraft.

When a failure of the electronic engine control system is detected, a sudden transition from the electronic engine control system to a back-up engine control system can be harmful to the turbo-machine. In fact, if the fuel flow computed by the electronic engine control system at its failure is far different from the fuel flow computed by the back-up engine control system when it is enabled, great damages can occur due to a the non-continuous supply of fuel.

Therefore there is a need for a reliable back-up control system that will smoothly take control of the turbo-machinery in the event of a failure.

SUMMARY OF THE INVENTION

It is an object of the present invention to provide an electronically operated back-up system for a turbo-machine to be use in case of failure of the main electronic engine control system.

It is another object of the present invention to provide an electronically operated back-up system for a turbo-machine that is not a duplication of the main electronic engine control system.

It is an object of the present invention to provide an electronically operated back-up system for a turbo-machine that is able to start the engine.

It is another object of the present invention to provide an electronically operated back-up system for a turbo-machine that is able to guarantee a minimum fuel flow in the engine in order to avoid a flameout.

It is another object of the present invention to provide an electronically operated back-up system for a turbo-machine that is able to avoid power increase or decrease in the engine during the transfer to the back-up control mode.

According to one aspect of the invention, there is provided a back-up system for controlling a turbo-machine via a fuel metering unit when the electronic engine control of the turbo-machine fails, which comprises a back-up burn fuel flow calculator, the back-up fuel flow calculator receiving at least the amount of fuel requested by the operator signal of the turbo-machine and the actual spool speed of the turbo-machine and computing an amount of fuel to provide to said turbo-machine in order to adjust its speed to obtain a spool speed equivalent to the amount of fuel requested by the operator signal, a last burn fuel flow storage, the last burn fuel flow storage storing the last burn fuel flow value provided by the electronic engine control before its failure, a transitional burn fuel flow manager, the transitional burn fuel flow manager receiving the amount of fuel computed by the back-up burn fuel flow calculator and the last bum fuel flow value stored in the storage and providing an amount of fuel to provide to the fuel metering unit.

According to another aspect of the invention, there is provided a method for determining a burn fuel flow value, comprising the steps of receiving a current fuel flow value provided to a fuel metering unit of a turbo-machine from a main burn fuel flow calculator, storing the current fuel flow value in a memory upon detection of a malfunction of the main burn fuel flow calculator, calculating a transitional value using the stored fuel flow value and a back-up burn fuel flow value received from a back-up burn fuel flow calculator and outputting the transitional value to said fuel metering unit.

According to another embodiment of the present invention, there is provided a method for determining a burn fuel flow value for an aircraft turbo-machine in case of a malfunction, the method comprising the steps of receiving a current fuel flow value from a main burn fuel flow calculator, storing the current fuel flow value prior to the malfunction, calculating a back-up burn fuel flow value using sensor readings from the aircraft and initially the stored current fuel flow value, wherein the calculating using an algorithm which is different from an algorithm used for calculating the main bum fuel value, the back-up burn fuel flow value having a smooth transition between the current fuel flow value prior to the malfunction and future burn fuel flow values and outputting the back-up burn fuel flow value to a fuel metering unit.

BRIEF DESCRIPTION OF THE DRAWINGS

The invention will be better understood by an examination of the following description, together with the accompanying drawings, in which;

FIG. 1a shows a block diagram of one embodiment of the present invention wherein a turbo-machine is driven by either an electronic engine control or a back-up control via a fuel metering unit;

FIG. 1b shows a block diagram of another embodiment of the present invention wherein a turbo-machine is driven by either an electronic engine control or a back-up control via a fuel metering unit; an overspeed control ensures that take proper measures are taken in case of an overspeed detection;

PREFERRED EMBODIMENT

Figure 2:
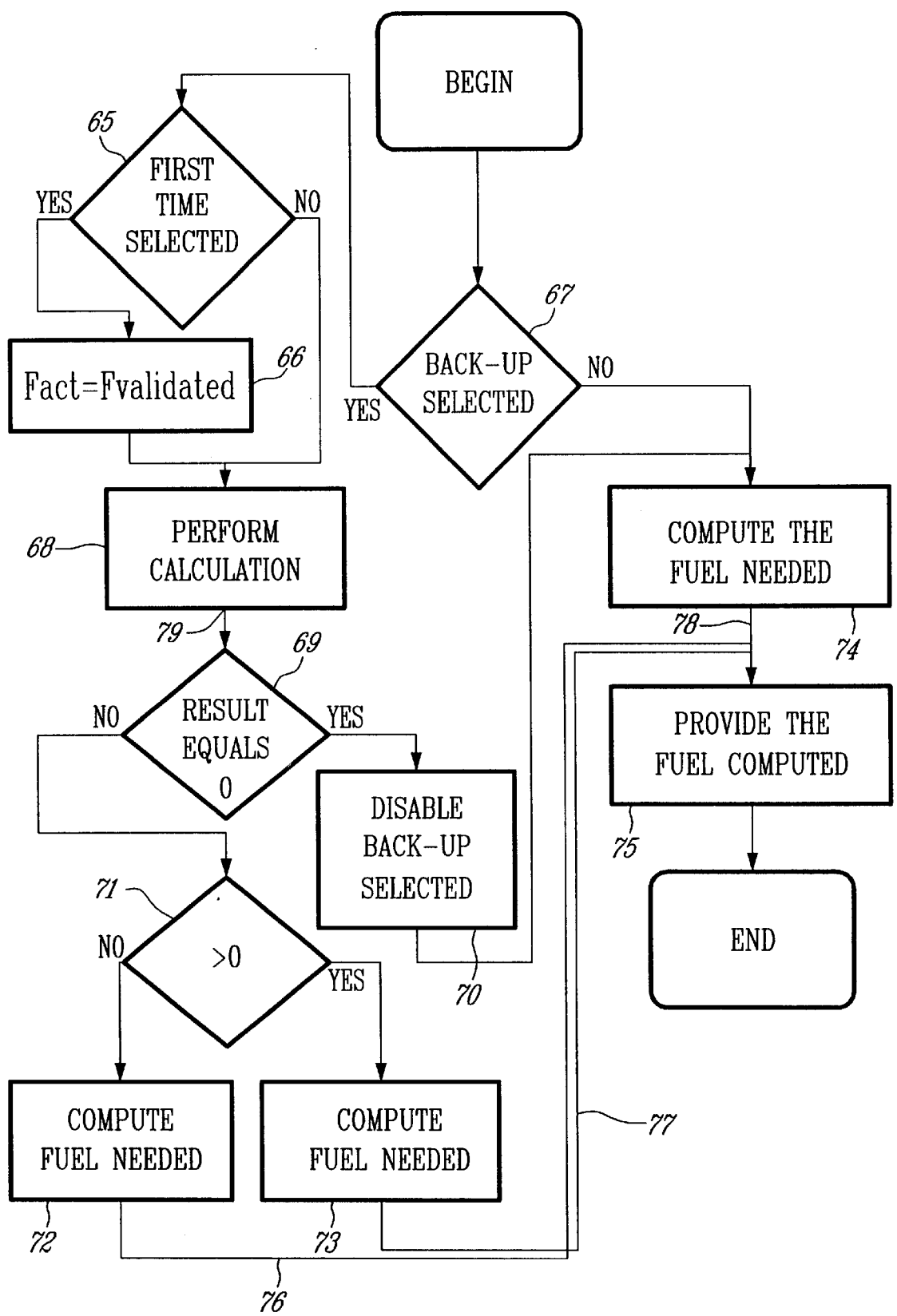
FIG. 2 shows a flow chart of the operations performed by an electronic engine backup control; in which a test is first performed to know if the back-up control is selected and in such a case, a test is performed to find out if this is the first time the back-up control has been selected while various operations are performed in each case in order to drive safely the turbo-machine.

Now referring to FIG. 1a, there is shown a turbo-machine 30. This turbo-machine 30 receives fuel from a fuel metering unit 20. The fuel metering unit 20 is fed by fuel which comes from the fuel tank of the aircraft. The fuel metering unit 20 is either driven by a main burn fuel flow calculator 14 or by a back-up control 25. In case of failure of the main burn fuel flow calculator 14, the back-up control 25 provides the burn fuel flow request to the fuel metering unit 20. Both the main burn fuel flow calculator 14 and the back-up control 25 collect information coming from a group of sensors 35. The type of information used by the main burn fuel flow calculator 14 and the back-up control 25 will be more detailed in the following description.

More precisely, and still referring to FIG. 1a, the group of sensors 35 comprises a Throttle Lever Angle (TLA) sensor 10, an ambient pressure ($P_{Amb}$) sensor 12, an ambient temperature ($T_{Amb}$) sensor 11 and a turbo-machine speed (N) sensor 13. A watchdog 16 receives the signals from the group of sensors 35. The watchdog 16 also receives the burn fuel flow request from the main burn fuel flow calculator 14. The watchdog 16 is then able to detect any failure from the main burn fuel flow calculator 14 knowing its inputs and its outputs. In case of a detection of a failure, the main burn fuel flow calculator 14 will inform the back-up control 25 and a multiplexer 19. The multiplexer 19 is responsible for selecting between the burn fuel flow request coming from the back-up system 15 and the burn fuel flow request coming from the main burn fuel flow calculator 14.

The back-up system 25 comprises a back-up burn fuel flow calculator 15, a storage of the last burn fuel flow 17 and a transitional burn fuel flow manager 18. The burn fuel flow calculator 15 may, in one embodiment of the present invention, be identical to the main burn fuel flow calculator 14. The purpose of the back-up burn fuel flow calculator 15 is to provide the amount of fuel that will allow the turbo-machine to adjust his speed in accordance with the TLA 10 chosen by the pilot of the aircraft. In case of a failure of the main burn fuel flow calculator 14, detected by the watchdog 16, the last burn fuel flow is stored by the last burn fuel flow storage 17. A transitional burn fuel flow manager 18 is enabled in such a case. This transitional burn fuel flow manager 18 will provide a burn fuel flow request value that will be equal to a value which is a transition from the last burn fuel flow value which is stored by the last burn fuel flow storage 17 and a value computed by the back-up burn fuel flow calculator 15. This will ensure a smooth transition from the time of failure to the time of recovery by the back-up burn fuel flow calculator 15.

Now referring to FIG. 1b, there is shown a back-up control 25. The back-up control 25 comprises an overspeed control 21. The overspeed control 21 receives the spool speed from a group of sensors 35. In case of an overspeed detection, the overspeed control 21 which controls the fuel metering unit 20 imposes a shutdown on the fuel delivery in the turbo-machine 30 via the fuel metering unit 20. In the preferred embodiment of the present invention, the group of sensors 35 comprises various identical sensors in order to provide safe information in case of failure of one sensor. Still referring to FIG. 1b, and for a sake of clarity, there is only shown two identical sensors for the spool speed measurement which are the spool speed sensor 13 and the overspeed spool speed sensor 22. In this embodiment, the back-up burn fuel flow calculator 15 receives also a delayed fuel flow value from a delay unit 26 and a signal from the watchdog unit 16. The back-up burn fuel flow calculator 15 also receives its computed burn fuel flow request value using feedback signal 24. These two features enable for instance a start-up of the engine in case of a failure of the main burn fuel flow calculator 14. In this embodiment of the invention a broad variety of control strategies may be implemented. The delay unit 26 helps to provide the last fuel flow value validated in order to offer a non-corrupted value in case of failure of the sensors; such a delay may be around 40 msec.

Now referring to FIG. 2, there is shown a flowchart which indicates the operations performed by the transitional burn fuel flow manager 18.

Figure 3:
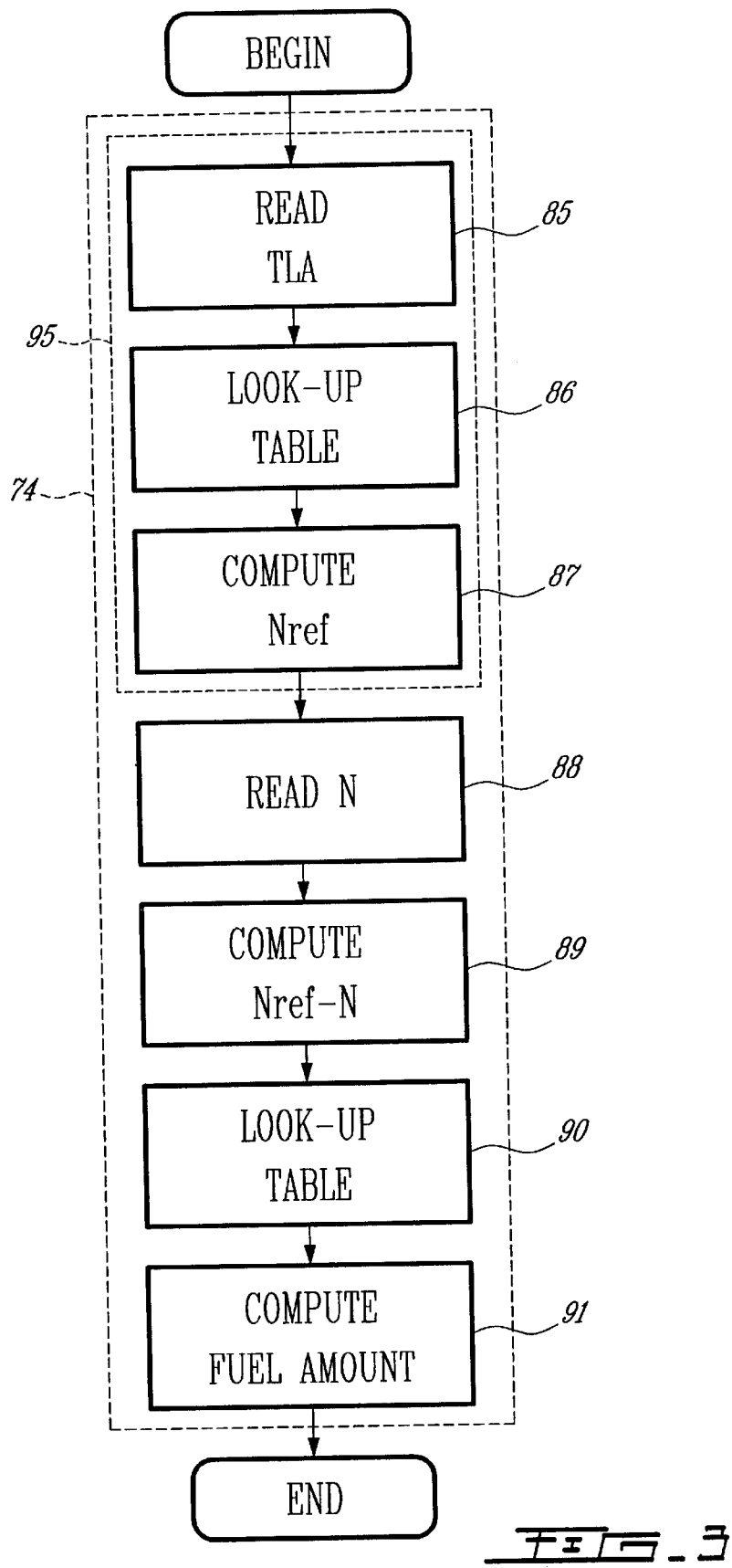
FIG. 3 shows a flow chart of the operations performed to compute the amount of fuel when the transition between the electronic engine control and the electronic engine back-up control is finished.
Figure 4:
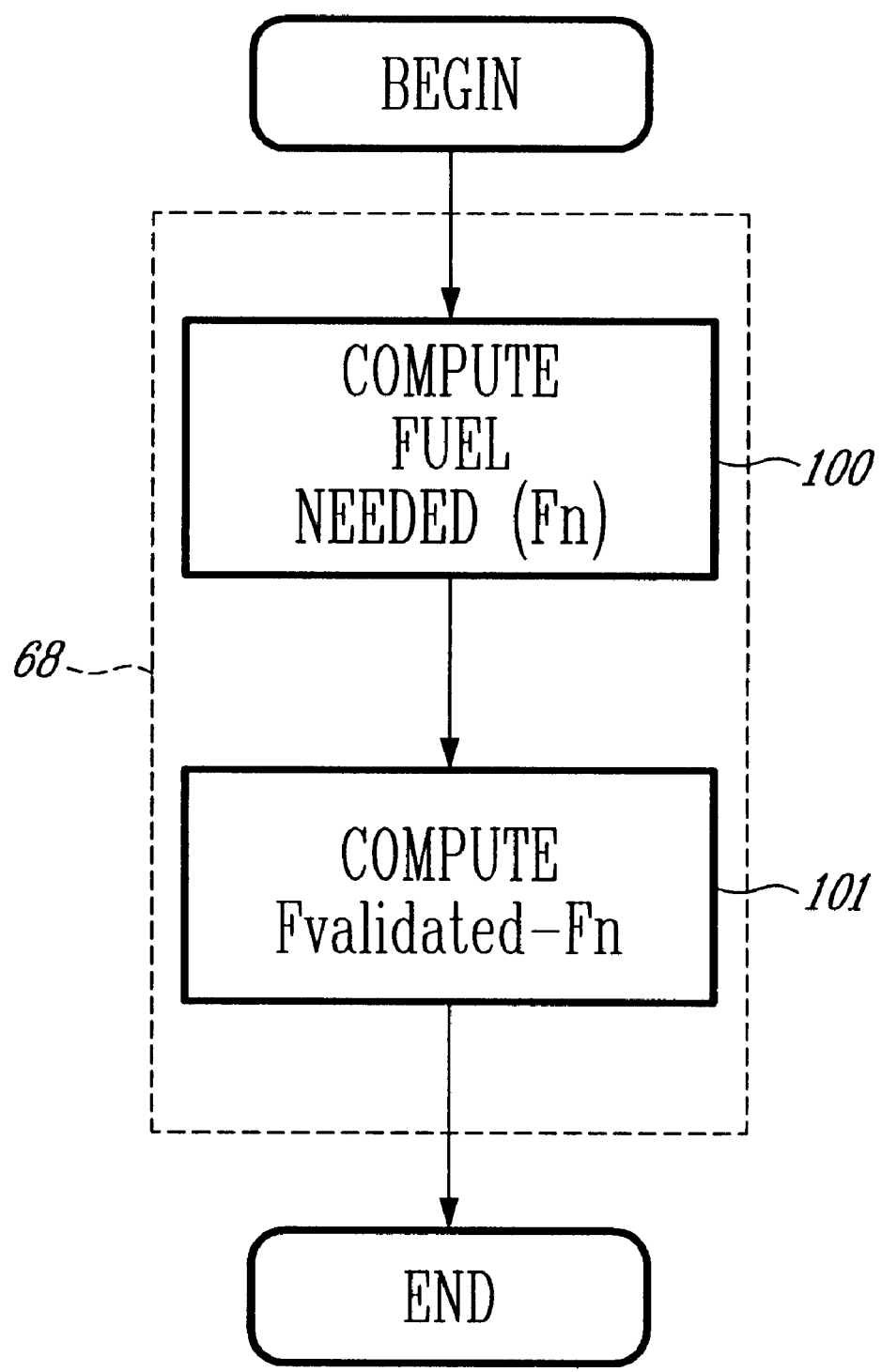
FIG. 4 shows a flow chart of the operations performed to compute the fuel needed.

According to step 67 of the present invention, a test is performed by the transitional burn fuel flow manager 18 in order to check if the back-up mode was selected. The back-up mode is defined as the period between the failure of the main burn fuel flow calculator 14 and the end of the tracking. If a back-up mode was selected, a test is performed according to step 65 of FIG. 2 to know if this is the first time the back-up mode is selected (i.e. the failure of the main burn fuel flow calculator 14 has just happened). If this is the first time that the back-up mode is selected and according to step 66, the fuel flow request is equal to the latest burn fuel flow request. The transitional burn fuel flow manager 18 uses the information stored inside the last burn fuel flow manager to obtain the latest burn fuel flow request. According to step 68, various calculations are then performed. Now referring to FIG. 4, there is shown the calculation performed during step 68. According to step 74, the fuel needed ($F_N$) is computed. The computation of the fuel needed ($F_N$) during step 74 is detailed in FIG. 3. This computation is performed by the back-up burn fuel flow calculator 15. According to FIG. 3, the TLA signal is read by the back-up burn fuel flow calculator 15. An access to a look-up table is done according to step 86. According to step 87, the TLA signal provides a speed reference ($N_{Ref}$) using the access to the look-up table. The actual speed of the turbo-machine is read according to step 88 and using the signal coming from the spool speed sensor 13. At this point, the difference between the speed reference and the actual speed is computed according to step 89. An access to a look-up table is performed according to step 90. Finally, the fuel needed is determined using the difference computed and the access to the look-up table.

Now referring back to FIG. 4, once the fuel needed is determined, as explained above, the difference between the latest burn fuel flow request ($F_{Validated}$) from the main burn fuel flow calculator 14 and the fuel needed ($F_N$) is computed according to step 101.

Now referring back to FIG. 2, a test is performed at step 69 on the result of the difference computed ($F_{Validated}-F_N$) 79. If the result is equal to zero, the tracking that ensures a smooth change between the latest burn fuel flow request from the storage 17 and the burn fuel flow request value given by the back-up proportional control loop from the back-up burn fuel flow calculator 15 is finished. According to step 70, the variable that indicates that a back-up mode is selected is disabled. According to step 75, the fuel needed ($F_N$) can then be provided to the fuel metering unit 20 via the multiplexer 19.

Figure 6:
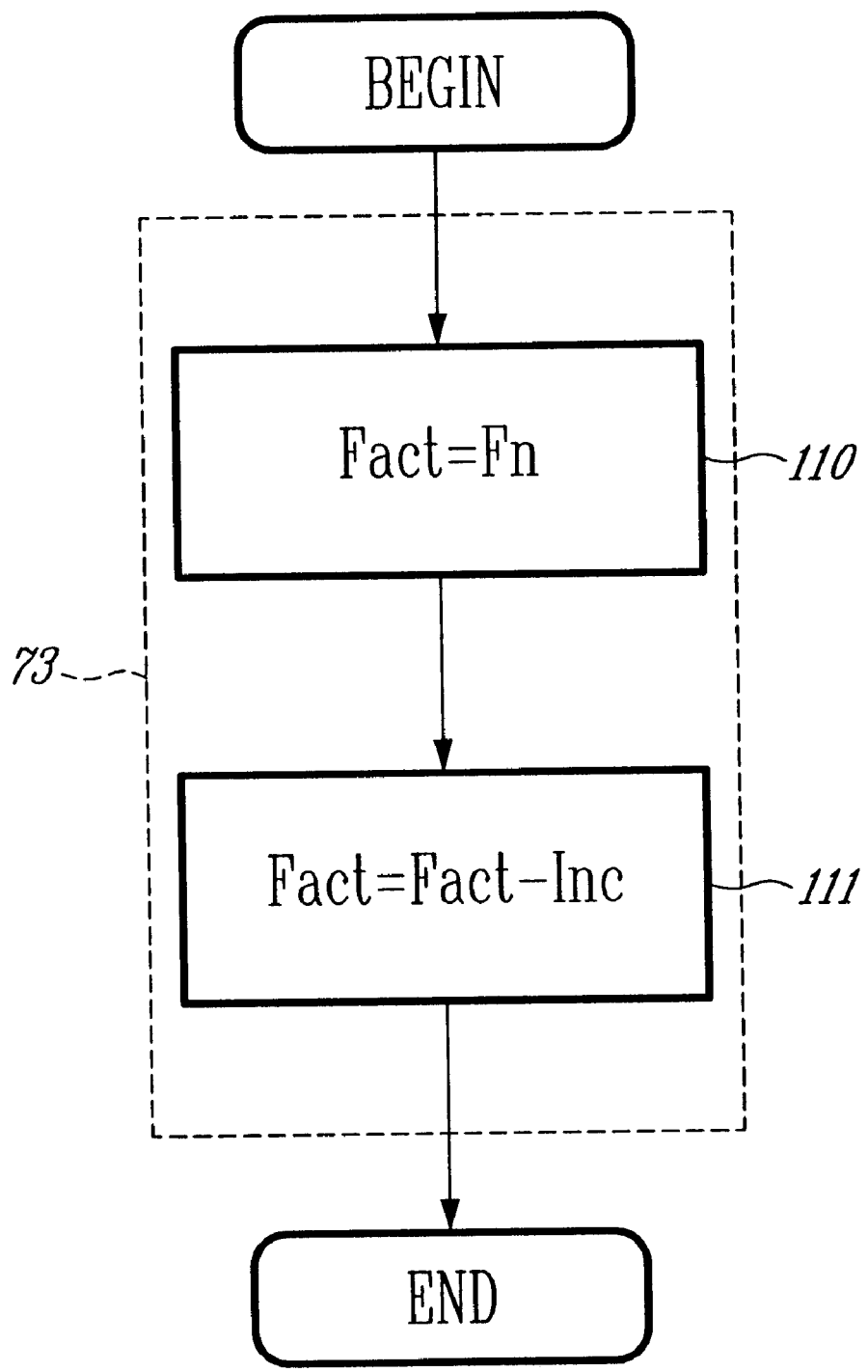
FIG. 6 shows a flow chart of the operations performed to compute the fuel needed in one case in which an increment is subtracted to a computed value.

If the result is not equal to zero, a test is performed according to step 71. This test consists in finding out if the result of the difference computed ($F_{Validated}-F_N$) 79 is superior to 0. If this is the case, i.e. if the latest fuel flow request is superior than the fuel needed, the amount of fuel to be provided will be computed according to step 73. Now referring to FIG. 6, there is shown the different steps performed during step 73. According to step 110, the spool speed of the turbo-machine ($F_N$) is loaded into a single variable ($F_{Act}$). According to step 111, an increment is subtracted from the value ($F_{Act}$) and the new value is stored under the single variable ($F_{Act}$).

Figure 5:
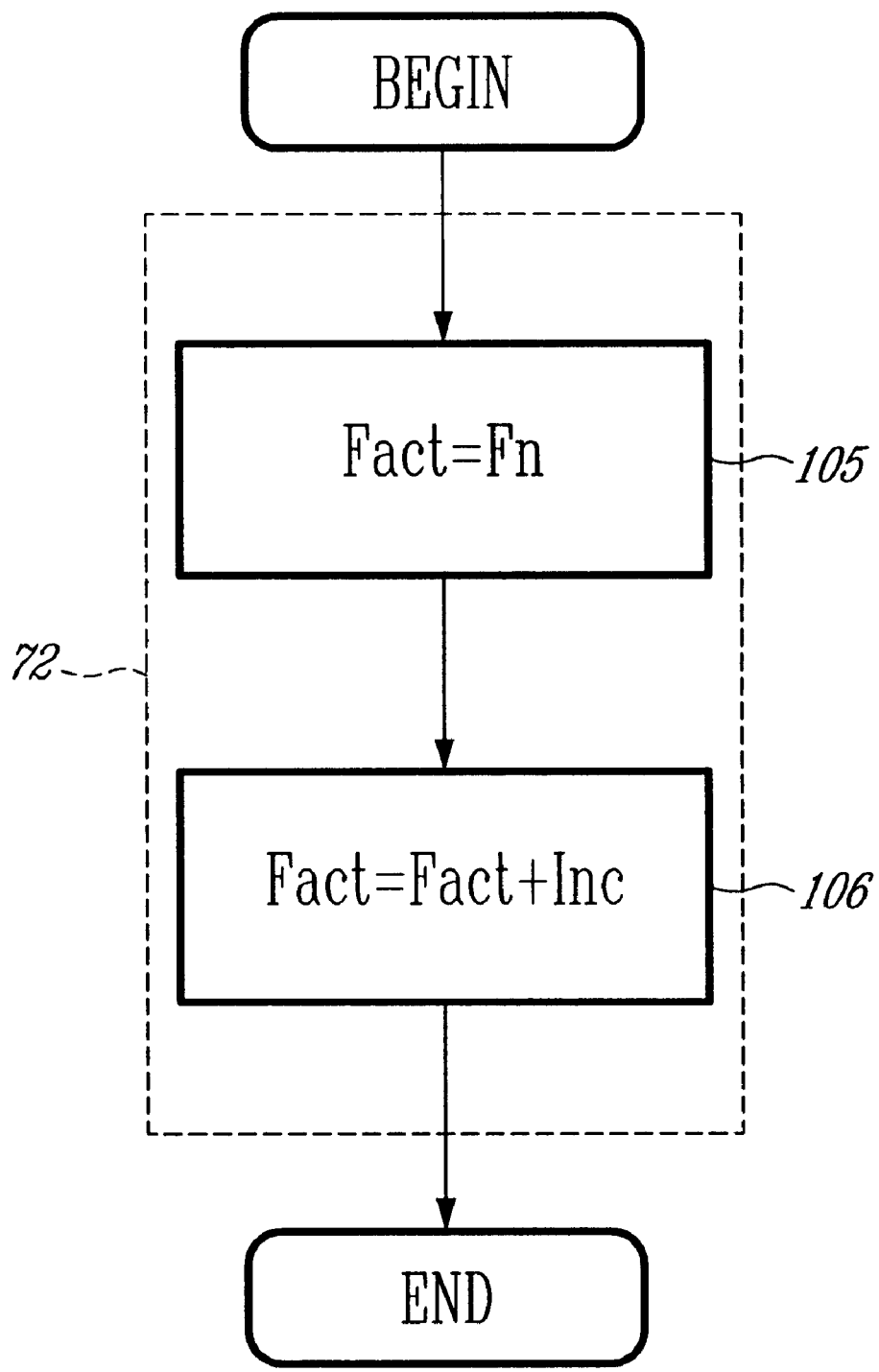
FIG. 5 shows a flow chart of the operations performed to compute the fuel needed in one case in which an increment is added to a computed value.

Now referring back to FIG. 2, if the difference computed ($F_{Validated}-F_N$) 79 is inferior to 0, the amount of fuel needed is computed according to step 72 of FIG. 2. Now referring to FIG. 5, there is shown, more precisely, the different steps performed during step 72. According to step 105, the spool speed of the turbo-machine ($F_N$) is loaded into a single variable ($F_{Act}$). Then, according to step 106, an increment is added to this single variable ($F_{Act}$) and the new value is stored under the single variable ($F_{Act}$).

In the case that the difference computed ($F_{Validated}-F_N$) 79 is inferior to 0, the single variable computed ($F_{Act}$) is used to provide the amount of fuel according to step 75. Similarly, in the case that the difference computed ($F_{Validated}-F_N$) 79 is superior to 0, the single variable computed ($F_{Act}$) is used to provide the amount of fuel according to step 75.

In this embodiment of the present invention, there is disclosed a way to control efficiently a turbo-machine in case of a failure of a main burn fuel flow calculator. This control is performed bearing in mind that the transition between the main burn fuel flow calculator 14 and the back-up burn fuel flow calculator 15 must be smooth.

What is claimed is:

1. A back-up system for controlling a turbo-machine via a fuel metering unit when a main electronic engine control of the turbo-machine fails and which comprises;

a back-up burn fuel flow calculator, said back-up fuel flow calculator receiving at least the amount of fuel requested by an operator signal of the turbo-machine and the actual spool speed of the turbo-machine and computing an amount of fuel to provide to said turbo-machine in order to adjust its speed to obtain a spool speed equivalent to said amount of fuel requested by the operator signal;

a last burn fuel flow storage, said last burn fuel flow storage storing the last burn fuel flow value provided by said main electronic engine control before its failure; and a transitional burn fuel flow manager, said transitional burn fuel flow manager receiving the amount of fuel computed by said back-up burn fuel flow calculator and said last burn fuel flow value stored in said storage and providing a transitional amount of fuel to said fuel metering unit.

2. The apparatus as claimed in claim 1, further comprising a non-volatile memory connected to said back-up burn fuel flow calculator.

3. The apparatus as claimed in claim 2, wherein said back-up burn fuel flow calculator receives also an ambient temperature and an ambient pressure from an ambient temperature sensor and an ambient pressure sensor.

4. The apparatus as claimed in claim 3, wherein said non-volatile memory comprises a look-up table which provides a relation between a fuel consumption of the turbo-machine and the speed of the turbo-machine, using said ambient temperature and said ambient pressure.

5. The apparatus as claimed in claim 1, wherein said transitional burn fuel flow manager receives an enabling signal from said main electronic engine control of the turbo-machine, said enabling signal being responsible for beginning said computing of the amount of fuel to provide to said fuel metering unit.

* * * * *